United States Patent
Grom et al.

(10) Patent No.: US 12,330,805 B2
(45) Date of Patent: Jun. 17, 2025

(54) SYSTEM AND METHOD FOR DETECTING THE POSITION AND/OR THE OPERATING STATE OF A MOVABLE COMPONENT OF AN AIRCRAFT

(71) Applicant: Liebherr-Aerospace Lindenberg GmbH, Lindenberg (DE)

(72) Inventors: Thomas Grom, Vilsingen (DE); Tobias Hartmann, Buchenberg (DE); Christian Kohlöffel, Amtzell (DE)

(73) Assignee: LIEBHERR-AEROSPACE LINDENBERG GMBH, Lindenberg (DE)

( * ) Notice: Subject to any disclaimer, the term of this patent is extended or adjusted under 35 U.S.C. 154(b) by 83 days.

(21) Appl. No.: 18/539,034

(22) Filed: Dec. 13, 2023

(65) Prior Publication Data
US 2024/0199226 A1 Jun. 20, 2024

(30) Foreign Application Priority Data
Dec. 14, 2022 (DE) ...................... 10 2022 133 268.3

(51) Int. Cl.
*B64D 45/00* (2006.01)
(52) U.S. Cl.
CPC .... *B64D 45/0005* (2013.01); *B64D 2045/001* (2013.01)
(58) Field of Classification Search
None
See application file for complete search history.

(56) References Cited

U.S. PATENT DOCUMENTS

| | | | | |
|---|---|---|---|---|
| 4,521,060 A | * | 6/1985 | Linton | F15B 18/00 188/170 |
| 11,810,478 B1 | * | 11/2023 | Richter | G06N 7/01 |
| 12,110,098 B1 | * | 10/2024 | Ricci Moretti | B64C 13/30 |
| 2019/0002121 A1 | | 1/2019 | Young et al. | |
| 2020/0156764 A1 | * | 5/2020 | Tzabari | B64C 13/28 |
| 2024/0084742 A1 | * | 3/2024 | Emrich | F02C 9/32 |
| 2024/0359821 A1 | * | 10/2024 | Kohlöffel | B64D 45/0005 |

FOREIGN PATENT DOCUMENTS

| | | | | |
|---|---|---|---|---|
| CA | 2602495 A1 | * | 11/2005 | ............. G01C 15/14 |
| CN | 102791574 A | | 11/2012 | |
| DE | 102014019135 A1 | | 6/2016 | |

\* cited by examiner

*Primary Examiner* — Fekadeselassie Girma
(74) *Attorney, Agent, or Firm* — McCoy Russell LLP

(57) ABSTRACT

The present disclosure relates to a system for detecting the position and/or the operating state of a movable component of an aircraft, wherein the system has one movable component, two actuators, two motion sensors, one asymmetry sensor, one drive train, and one monitoring device; wherein the component can be actuated by the at least two mutually offset actuators; wherein at least one motion sensor is provided for one respective actuator; wherein the motion sensor can monitor a mechanical movement of the drive train; wherein the monitoring device is connected to the motion sensors and to the asymmetry sensor, and wherein the system is configured such that an initialization of the monitoring device and/or of the motion sensors and/or of the asymmetry sensor can take place after a booting of the system and/or when the component has adopted a fully retracted and/or a fully extended position.

12 Claims, 2 Drawing Sheets

SYSTEM AND METHOD FOR DETECTING THE POSITION AND/OR THE OPERATING STATE OF A MOVABLE COMPONENT OF AN AIRCRAFT

CROSS REFERENCE TO RELATED APPLICATION

The present application claims priority to German Patent Application No. 10 2022 133 268.3 filed on Dec. 14, 2022. The entire contents of the above-listed application are hereby incorporated by reference for all purposes.

TECHNICAL FIELD

The present disclosure relates to a system for detecting the position and/or the operating state of a movable component of an aircraft, wherein the system has one movable component, two actuators, two motion sensors, one asymmetry sensor, one drive train, and one monitoring device, wherein the component can be actuated by the at least two mutually offset actuators, wherein at least one motion sensor is provided for one respective actuator, wherein the motion sensor can monitor a mechanical movement of the drive train, and wherein the monitoring device is connected to the motion sensor and to the asymmetry sensor.

BACKGROUND

Sensor systems are known from the prior art for monitoring the correct function of control surfaces, in particular on the wings of an aircraft. The aircraft are equipped in a known manner with control surfaces such as slats and landing flaps to vary the aerodynamic properties of the wings.

SUMMARY

Individual flaps of such lift aids are as a rule driven together by a plurality of actuators, with the actuators being arranged offset over the length of the flap and thus driving different partial regions of the flap.

If the two actuators do not run synchronously, flap skew occurs up to a complete failure due to mechanical deadlock. The flap can also release ("disconnect") from the actuator.

Skew produces a fault categorized as a "catastrophic failure". The position of the flaps must therefore be continuously monitored, with a monitoring typically being necessary on an independent monitoring channel. A disconnect only leads to a catastrophic failure in combination with a further fault. The disconnect fault may therefore not be dormant and is monitored by checking intervals or by other monitoring devices. Since a reduced availability of the monitoring is possible, it can be accepted that a disconnect is recognized within a flight.

Faults such as skew and disconnect are sometimes recognized by an increased maintenance effort using visual inspections in aircraft of older designs.

This requires the actuators to be adapted to a higher load, that can arise, for example, by the breakage of a second actuator, and thus to have an increased weight, while taking account of an inspection interval, e.g. to the amount of 10,000 flight cycles.

Aircraft of more recent designs or licensed according to new licensing regulations use sensor systems, that have to be reinitialized again on a replacement of the sensor or on other changes to the system, for the recognition of the position of movable elements or flaps. The initialization can also be called "rigging".

In accordance with the prior art, when a failure occurs all the sensors or the connections of the flap to the structure, and also the actuators, are inspected since which component is affected is not known.

To enable a monitoring of a plurality of actuators at a flap, the kinematics or the connection of the sensors in accordance with the prior art are adapted such that a comparability of the measured values of the sensors with one another is possible.

Existing position based monitoring systems, in particular for a disconnect recognition, provide lower resolution and are thus less robust. Further measures such as a reduced clearance at the flap or such as reduced precision at the sensor are therefore necessary to enable the recognition likelihood of skew or disconnect.

The monitoring systems of the prior art inter alia have the following disadvantages: The actuators require mutually comparable kinematics at a flap. A higher effort is required after replacement of parts as part of maintenance. The sensor system has lower resolution or causes higher costs. The sensor system has less robustness in operation. Absolute sensors are required. The installation of a sensor at kinematically different positions is not possible.

Against this background, it is the underlying object of the present disclosure to provide a system that is improved with respect to the prior art, in particular with respect to initialization.

This object is satisfied by the subject matter as described herein.

Provision is accordingly made in accordance with the disclosure that the system is configured such that an initialization of the monitoring device and/or of the motion sensors and/or of the asymmetry sensor can take place after the booting of the system and/or when the component has adopted a fully retracted and/or a fully extended position.

The initialization optionally only takes place at a fully retracted or extended position, but can also take place in any other position.

A sensor is optionally understood under the term "asymmetry sensor" that is configured to recognize asymmetries, but with also any desired sensor also being able to be understood under this term.

The drive train optionally runs through practically the whole wing.

Provision is optionally made that the monitoring device is configured such that a limit value and/or a limiting curve can be calculated by means of the asymmetry sensor while taking account of correction values for kinematic conditions and/or tolerances and/or operational conditions, with the limit value and/or the limiting curve being able to be used for the recognition of skew of the component and/or for the recognition of the disconnect of the component from an actuator.

Provision is optionally made that the monitoring device is configured such that the initialization takes place by an initialization angle of the component calculated by means of the asymmetry sensor and a correlation curve.

Provision is optionally made that the monitoring device is configured such that an angle of the component takes place based on the correlation curve by adding or subtracting a converted differential flap able from the initialization angle. to/

Provision is optionally made that the monitoring device is configured such that an absolute difference of the angles of the component from a limit value can be compared, with an exceeding of the limit value being able to result in a switching off of the system and a setting of a brake.

Provision is optionally made that the monitoring device is configured such that a value of the asymmetry sensor can be converted into a theoretical angle of the component.

Provision is optionally made that the monitoring device is configured such that a difference between an angle of the component and the theoretical angle of the component can be formed, with the difference from a limit value being able to be compared, with an exceeding of the limit value being able to result in a report.

Provision is optionally made that the monitoring device is configured such that an isolation of a cause of skew of the component and/or a disconnect of the component from an actuator can take place.

A system in accordance with any of the preceding elements, characterized in that the component is an actuable lift aid, in particular a slat or a landing flap.

Provision is optionally made that the motion sensors and/or the asymmetry sensor are/is an incremental sensor.

The disclosure also relates to an aircraft, in particular to an aircraft having a system in accordance with the disclosure.

The disclosure also relates to a method of detecting the position and/or the operating state of a movable component of an aircraft having a system in accordance with the disclosure, wherein an initialization of the monitoring device and/or of the motion sensors and/or of the asymmetry sensor takes place after a booting of the system and/or when the component has adopted a fully retracted and/or a fully extended position, The initialization or "rigging" on a replacement of a sensor is advantageously dispensed with by the system and method in accordance with the disclosure. The system likewise has a greater robustness in operation. The recognition of disconnect faults is improved. A simple failure isolation can take place after the occurrence of skew and/or a disconnect. Different kinematic sensor connections within a flap or its drive system are made possible. The use of less expensive incremental sensors can take place.

The mechanical to electrical rigging that is always required in accordance with the prior art can optionally be bypassed by the system and method in accordance with the disclosure so that the maintenance effort on the replacement of a sensor or the monitoring device can be reduced.

Fault isolation is optionally made possible after a recognized skew.

Optionally, the resolution of the system is increased and thus a recognizability of a possible disconnect fault is increased since the recognized movement difference becomes larger.

The threshold value of the monitoring device corresponding to the position is offset with correction values for tolerances and operational conditions using an asymmetry sensor to ensure higher robustness and also the required trigger threshold. Possible differences in the kinematics of the flaps or of the measuring device are optionally compensated to make a conversion to a common reference value.

An automatic rigging optionally takes place, in particular on the basis of the asymmetry sensor, in the fully retracted and/or fully extended position of the component and/or after booting the system. A booting of the system can be understood as a switching on or as a first time supply of electrical energy to the electrical component of the system.

Compensation optionally takes place on the basis of kinematics and/or an operational state on the basis of measured values of the asymmetry sensor and/or of further sensors present in the system.

A comparison optionally takes place of the difference of compensated curves of two sensors of a flap from one another with a variable limit value that is fixed on the basis of the asymmetry sensor and also of the operational state of the aircraft.

The operational state of the aircraft can comprise a state in which the aircraft is on the ground or is in flight and/or can comprise a direction of travel of the system and/or can comprise a fully retracted and/or fully extended position of the component and/or can comprise a flight speed. The list is not exclusive. Additional examples include: angle of attack, load status, outside temperature, and/or altitude of the aircraft.

A comparison optionally takes place of the difference of compensated motion sensor and asymmetry sensor curves with a variable limit value that is fixed on the basis of the asymmetry sensor and also of the operational state of the aircraft.

An increase of the resolution of the disconnect monitoring optionally takes place by utilizing the deformation of the gasket load reactions in the fully retracted state of the component and a rigging in this state.

An implementation is optionally possible with sensors that do not have any absolute position, that is with incremental sensors.

The features of the system are optionally mutatis mutandis also features of the method.

It is pointed out at this point that the terms "a" and "one" do not necessarily refer to exactly one of the elements, even though this represents a possible embodiment, but can also designate a plurality of the elements. The use of the plural equally includes the presence of the element in question in the singular and conversely the singular also comprises a plurality of the elements in question. Furthermore, all the features of the disclosure described herein can be combined with one another or can be claimed in isolation from one another as desired,

BRIEF DESCRIPTION OF THE FIGURES

Further advantages, features, and effects of the present disclosure result from the following description of preferred embodiments with reference to the Figures in which components that are the same or similar are designated by the same reference numerals. There are shown.

DETAILED DESCRIPTION

Figure 1:
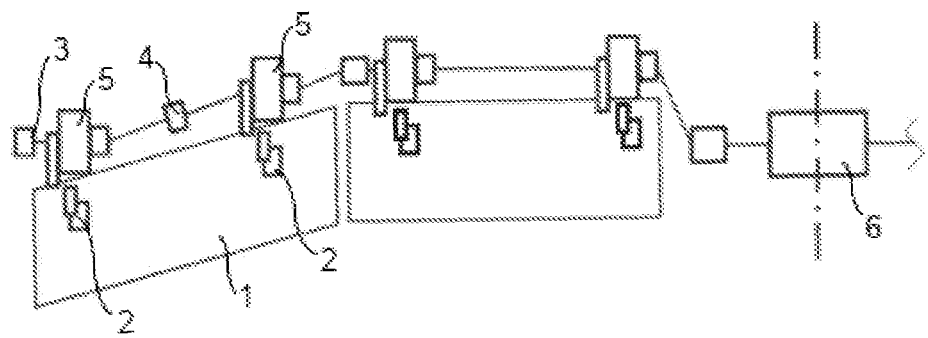
FIG. 1: a schematic view of an embodiment of a system in accordance with the disclosure.

A system in accordance with the disclosure is shown in FIG. 1 having two flaps 1, two motion sensors 2 per flap, an asymmetry sensor 3, optionally per flap 1, a brake 4, two drive stations 5 per flap 1, and a drive unit 6.

The calculated value of the flap angle is initialized for the recognition of skew on a power-up or booting of the system or when the fully retracted state of the flap 1, based on the asymmetry sensor 3, has been reached. This value is converted from the value of the asymmetry sensor 3 with the aid of a correlation curve and/or is initialized for the respective flap.

Figure 2:
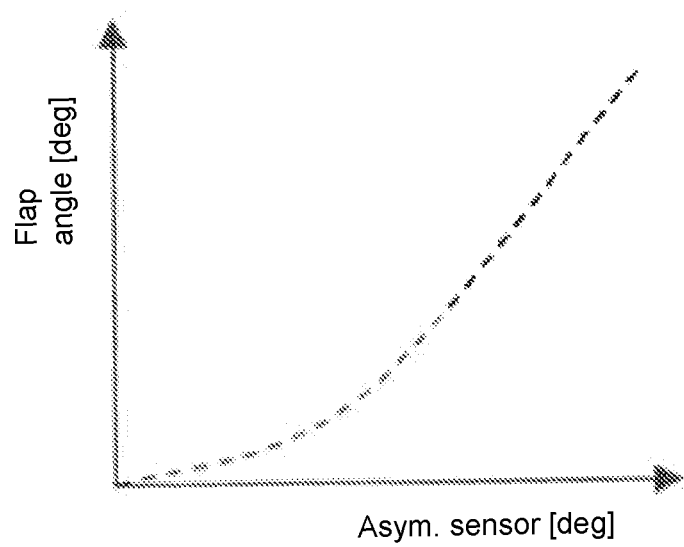
FIG. 2: a diagram of a correlation curve.

Such a correlation curve is shown in FIG. 2, with the angular value of the asymmetry sensor 3 being shown in degrees on the abscissa of the diagram and the flap angle in degrees being shown on the ordinate.

A further movement of the motion sensor is calculated on the basis of the correlation curve by adding or subtracting the converted differential flap angle to/from the initial value of the flap angle.

In the next step, the absolute difference of the current flap angle of the flap from a limit value is compared. With the limit value being defined on the basis of a limit value cure dependent on the asymmetry sensor. In addition, the limit value curve can be dependent on further measured data that are available to the evaluation unit, e.g., for instance, the direction of travel of the system, the load state (flight, ground), or also the flight speed.

Figure 3:
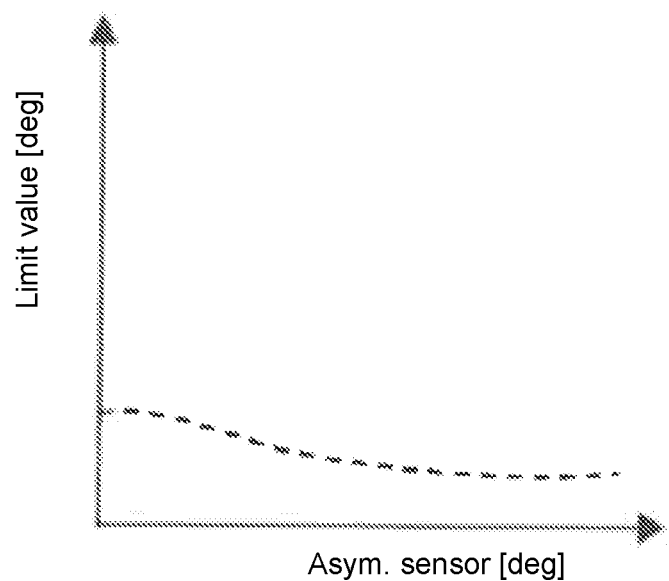
FIG. 3: a diagram of a limit value curve.

Such a limit value curve is shown in FIG. 3, with the angular value of the asymmetry sensor 3 in degrees being shown on the abscissa of the diagram and the limit angle in degrees being shown on the ordinate.

An exceeding of the limit value results in the immediate switching off of the system and the setting of the brakes 4 of the system to set it into a safe state.

For the failure isolation, the difference of the affected sensors of a flap 1 from the theoretical flap angle value, that is derived from the asymmetry sensor 3, is formed, as also takes place on the recognition of the disconnect.

Unlike the above-presented recognition of the skew, the value of the asymmetry sensor 3 is converted into a theoretical flap angle value on the recognition of the disconnect. The difference between the respective current flap angle value and the theoretical flap angle is formed. As also in the recognition of the skew, this value is then compared with a limit value on the basis of the limit value curve.

A triggering of the monitoring device or of the monitor or of the recognition does not result in the immediate switching off of the system, but rather in the display of a maintenance message after the end of the flight. This results in a maintenance action before the next flight can be started.

An increase in the resolution of the system is achieved in that the rigging is carried out every time the retracted position of the flap has been reached. In the event of an existing disconnect of an actuator, the flap will not reach the fully retracted position due to the applied forces of friction in the kinematics and gaskets that urge the flap outwardly. The flap is urged outwardly within the flap stiffness.

If the system then reverses the direction of rotation and travels the flap in the direction of "extended", the direction of load or friction reverses and the flap will in turn execute a smaller movement. This produces an increase in the difference that is measured in comparison with a system rigged in the intact state.

Figure 4:
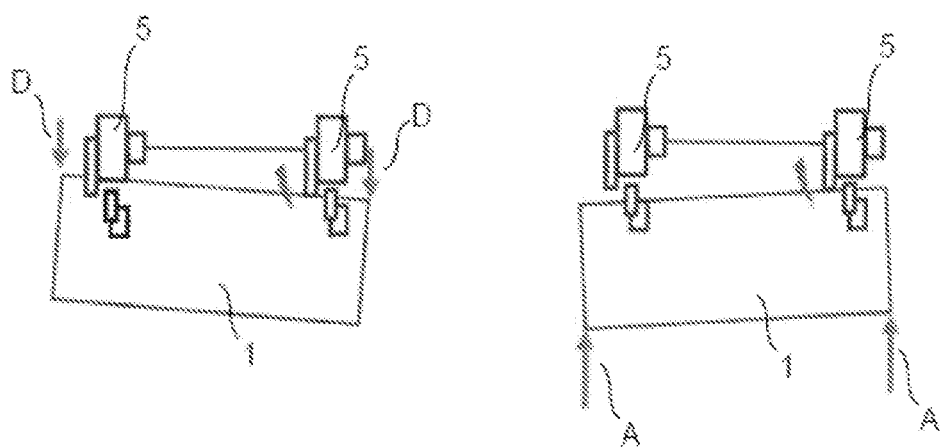
FIG. 4: two schematic views of an embodiment of a system in accordance with the disclosure.

The operating states in the event of a disconnect are shown in more detail in FIG. 4, with the flap 1 being shown in the retracted state in the left view in FIG. 4 and in the extended state in the right view in FIG. 4.

The disconnect has occurred at the right drive station 5 in FIG. 4.

In the retracted state, the damping forces D act on the flap 1.

In the extended state, the aerodynamic forces A act on the flap 1.

The disclosure has the following advantages:
  reduced maintenance effort on an replacement of a sensor and/or computer
  faster replacement of affected units due to failure isolation
  greater robustness of the skew detection
  greater robustness and/or resolution of the disconnect detection
  use of different kinematically linked sensors within a flap for skew/disconnect detection
  implementation possible with incremental sensors.

The recognition of skew can take place as follows:
preprocessing of the position values of a sensor;
  the position value is set to approximately zero when switching on and in the fully retracted state;
  the position value is increased or decreased as the sensor moves;
  an FSPS value is used to recognize whether the flap has been fully retracted and the FSDS value is reset to determine the actual value;
  a kinematic correction is applied to the FSPS value so that the final calculated value corresponds to the angle of the slat on every flap track;
  the skew recognition compares the preprocessed values of the two FSDS values of a flap. The difference of the preprocessed values indicates the degree of skew of the flap;
  the isolation function indicates a fault for the one flap track, that is whether the fault is present internally or externally at the flap that deviates more from the preprocessed position of the flap track on the opposite wing.

The recognition of a disconnect can take place as follows:
  the disconnect recognition used preprocessed values as defined above;
  the disconnect recognition is only activated after the autorigging has been carried out at least once;
  the individual FSDS is compared with a minimum threshold value calculated from the FSPS;
  the disconnect recognition converts the current transmission position (i.e. the FSPS position) into an expected FSDS position for this purpose;
  the nonlinear transmission characteristic and the expected stiffness are taken into account in the limit value;
  due to the autorigging function that occurs on the retraction of the flaps after landing, the mechanical disconnect fault results in a skewed flap due to the weight of the flap when the flap is fully withdrawn. The produces a preload of the disconnect recognition and ensures the recognition in the subsequent flight;
  the functional principle of the comparison of the value of the motion sensor (FSDS) with the value of the asymmetry sensor (FSPS) allows both the continuous monitoring of the sensor values for plausibility and an immediate failure localization on the affected flap track.

The flap sensors are located at the track structure and are mechanically connected to the flap track carriage by levers and rods. Unlike sensors for the recognition of skew of slats, the flap sensors are absolute sensors such as resolvers; however, the evaluation units (FSCUs) treat them as non-absolute sensors to avoid a rigging of the sensors becoming necessary. For this purpose, the position value is set to approximately zero on the switching on and in the fully retracted state and the value is increased or decreased as the sensor moves. The FSPS value is used to recognize whether the flap has been fully retracted and to determine the actual value to which the FSDS value is reset. A kinematic correction can be applied to the FSPS value so that the calculated end value corresponds to the flap angle on every track. The value can also be used in the recognition without any kinematic correction. Due to the architecture, every FSCU is connected to a channel of a duplex sensor that is located at both tracks of the same flap. Every FSCU monitors two flap fields; the flap FSCUs 1 and 2 monitor the left and right fields 2 and the slat FSCUs 1 and 2 monitor the left and right flaps 1. The skew avoidance works fully independently in every FSCU. The recognition compares the converted values of the two FSDS values of a flap. The difference of the converted (or not converted) values indicates the degree of skew of the flap; The skew monitor triggers on a significant discrepancy between the values. If both flap FSCUs recognize the skew of the flap, the flap FSCU responds by switching off its drive; a slat FSCU reports the recognition to both flap FSBs. The receiving FSCUs for flaps switch off their drives when they receive a signal from both slat FSCUs. As with the slat skew recognition, the above consolidation pattern does not take any received information into account, e.g. because the transmission unit cannot transmit, e.g. power failure or no transmission error, e.g. wire break identical to the state "skew recognized" received by the communication partner. On the one hand, this logic ensures that in the event of a skew of the panel both slat FSCUs recognized the failure and switch of their motors and thus stop the slat system; on the other hand, it ensures that the FSCUs remain ready for operation in the event of a single electrical fault (e.g. sensor failure). It is thereby ensured that the slat system remains ready for operation (and consequently that the skew avoidance function remains available in the most unfavorable case, i.e. on a failure of the FSCU for the landing flaps and of an FSCU for the slats). If the skew position monitor triggers, the isolation function reports a failure for the one track (internally or externally on the switch panel on which the skew was recognized) that differs more from the position of the opposite wing track.

The function of disconnect recognition uses the preprocessed FSDS sensor values from the function of skew avoidance. The preprocessing comprises setting to zero (autorigging) when the flap has been fully retracted while it is on the ground and also comprises kinematic compensation. The disconnect recognition is only activated after the autorigging has been carried out at least once; Similar to the function for avoiding skew, the flap FSCUs 1 and 2 observe the left and right flaps 2 while the slat FSCUs 1 and 2 monitor the left and right flaps 1. The disconnect recognition works fully independently in every FSCU. Unlike the disconnect recognition for slats, the disconnect recognition for flaps is fully available under all dispatch configurations. Differing from the skew avoidance that compares the converted FSDS values of a flap with one another, every single FSDS is compared with a minimum threshold value that is calculated by the FSPS. For this purpose, the flat disconnect recognition converts the actual transmission position, i.e. the FSPS position, into an expected minimal FSDS position and in so doing takes account of the nonlinear transmission characteristic and the expected stiffness of the kinematics. One track more than in normal operation is inwardly urged in the event of a disconnect. The sensitivity of the disconnect monitoring varies over the stroke since the expected compression effect of the air load varies in normal operation. Since the compression also varies over the stroke of the flap extension on a failure, the recognition does not recognize the mechanical failure immediately, but rather when the system is changed to a position having a high monitoring sensitivity and a high effect of the air load. The effect of the air load could even then be too small to be recognized by the disconnect monitoring during this flight cycle. Due to the autorigging function that takes place on the retraction of the flaps after landing, the mechanical disconnect results in a skewed flap due to the weight of the flap. The disconnect monitoring is thereby preloaded and the recognition takes place in the subsequent flight. The system thus recognizes the disconnect at the latest in the subsequent flight after the occurrence of the disconnect. It may occur due to the different design that the skew recognition recognizes a defect, but the disconnect does not, with the defect nevertheless being recognized, however. This is taken into account in the prediction of the system availability. Since the mechanical switching off of the flap does not represent a direct threat, the disconnect recognition does not protect against direct threats, but rather delivers a CAS display to avoid latency time for the mechanical failure. To force the required maintenance measures, the slat system is switched off as soon as the aircraft is on the ground after a disconnect of a partial system has been recognized by all of the active FSCUs that can be in the normal mode or the failsafe mode. The functional principle of the comparison of the FSDS with the FSPS value allows both the continuous monitoring of the sensor track values for plausibility and an immediate defect localization for the affected flap trajectory. Defective FSDS signals can be recognized on a plurality of levels. If the signal quality, i.e. the voltage, is outside an acceptable range, the RCDS recognizes the defect that is displayed by the FSDS monitoring device. If one FSDS signal is defective while the others are correct, the flap skew recognition recognizes a significant difference and results in a defect report. If a plurality of FSDS signals are defective, e.g. static, the disconnect recognition recognizes the delay of the FSDS signal relative to the transfer movement during the movement. These defects are thus recognized within a flight.

The invention claimed is:

1. A system for detecting the position and/or the operating state of a movable component of an aircraft, wherein the system has one movable component, two actuators, two motion sensors, one asymmetry sensor, one drive train, and one monitoring device; wherein the component can be actuated by the at least two mutually offset actuators; wherein at least one motion sensor is provided for one respective actuator; wherein the motion sensor can monitor a mechanical movement of the drive train; and wherein the monitoring device is connected to the motion sensors and to the asymmetry sensor, wherein the system is configured such that an initialization of the monitoring device and/or of the motion sensors and/or of the asymmetry sensor can take place after a booting of the system and/or when the component has adopted a fully retracted and/or a fully extended position.

2. A system in accordance with claim 1, wherein the monitoring device is configured such that a limit value and/or a limiting curve are calculated by means of the asymmetry sensor while taking account of correction values for kinematic conditions and/or tolerances and/or operational conditions, with the limit value and/or the limiting curve being able to be used for the recognition of skew of the component and/or for the recognition of the disconnect of the component from an actuator.

3. A system in accordance with claim 1, wherein the monitoring device is configured such that the initialization takes place by an initialization angle of the component calculated by means of the asymmetry sensor and a correlation curve.

4. A system in accordance with claim 3, wherein the monitoring device is configured such that an angle of the component takes place one the basis of the correlation curve by adding or subtracting a converted differential flap angle to/from the initialization angle.

5. A system in accordance with claim 3, wherein the monitoring device is configured such that an absolute difference of the angles of the component from a limit value can be compared, with an exceeding of the limit value being able to result in a switching off of the system and a setting of a brake.

6. A system in accordance with claim 1, wherein the monitoring device is configured such that a value of the asymmetry sensor can be converted into a theoretical angle of the component.

7. A system in accordance with claim 6, wherein the monitoring device is configured such that a difference between an angle of the component and the theoretical angle of the component can be formed, with the difference from a limit value being able to be compared, with an exceeding of the limit value being able to result in a report.

8. A system in accordance with claim 1, wherein the monitoring device is configured such that an isolation of a cause of skew of the component and/or of a disconnect of the component from an actuator can take place.

9. A system in accordance with claim 1, wherein the component is an actuable lift aid.

10. A system in accordance with claim 1, wherein the motion sensors and/or the asymmetry sensor is/are an incremental sensor.

11. An aircraft, having a system in accordance with claim 1.

12. A method of detecting the position and/or the operating state of a movable component of an aircraft having a system in accordance with claim 1, wherein an initialization of the monitoring device and/or of the motion sensors and/or of the asymmetry sensor takes place after a booting of the system and/or when the component has adopted a fully retracted and/or a fully extended position.

* * * * *